Jan. 23, 1968
D. J. DOWLING
3,365,158
CAN HOLDER
Filed April 18, 1966
2 Sheets-Sheet 1
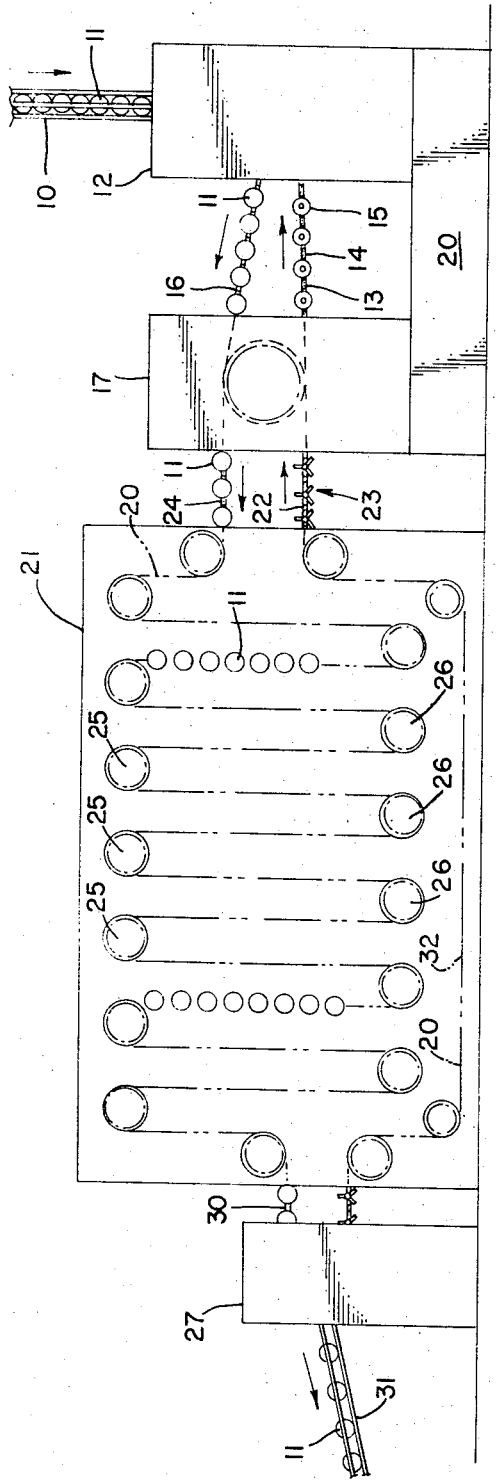
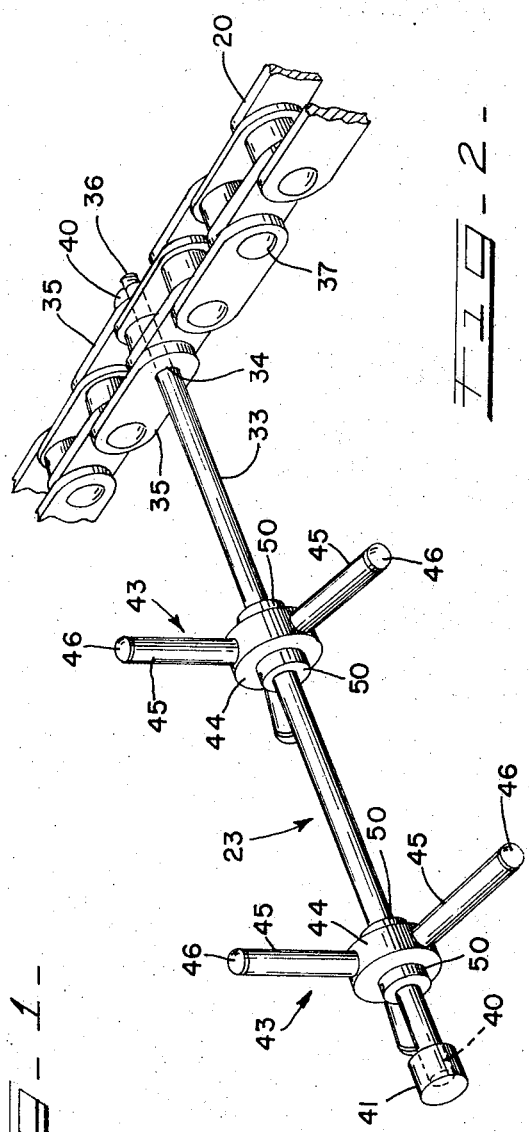
INVENTOR
DANIEL J. DOWLING
BY Walter H. Beland
AGENT Jan. 23, 1968                  D. J. DOWLING                 3,365,158
                                CAN HOLDER
Filed April 18, 1966                                    2 Sheets-Sheet 2
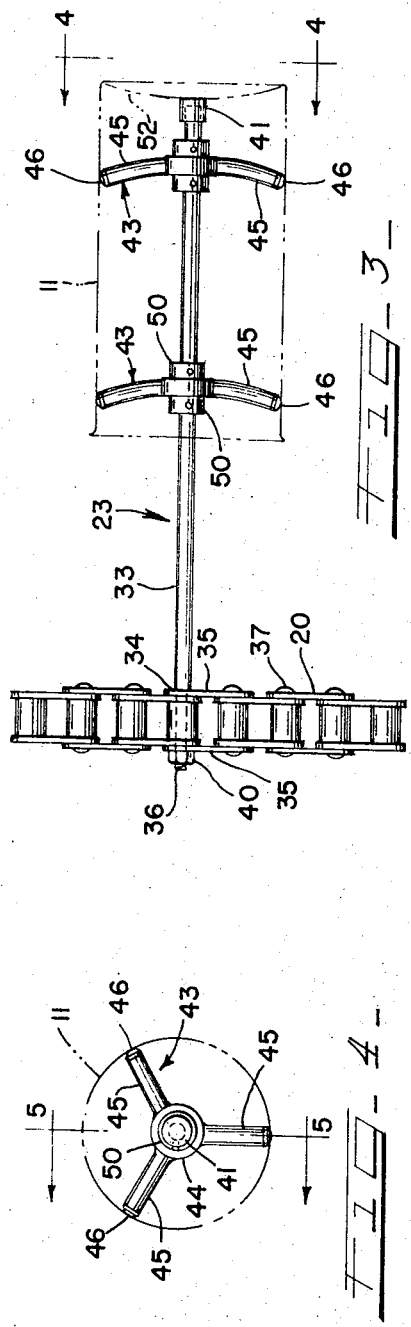
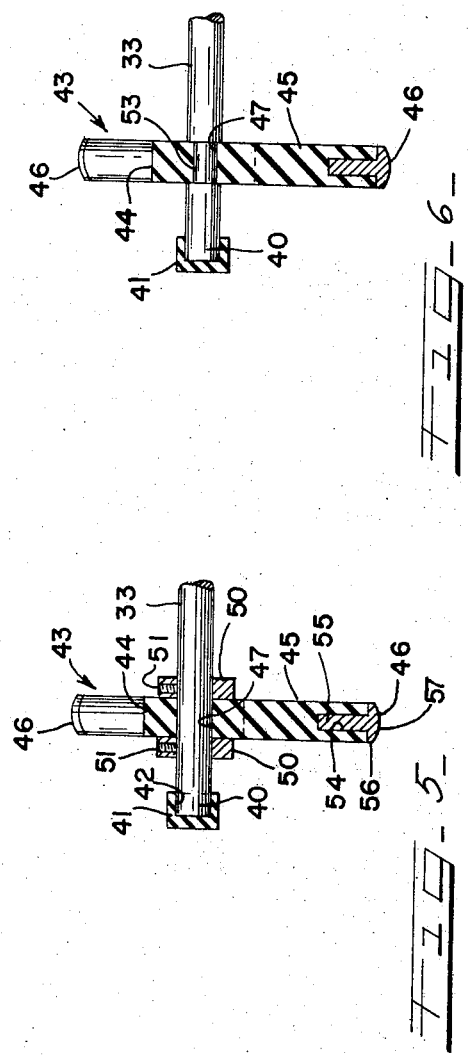
INVENTOR
DANIEL J. DOWLING
BY *Walter H. Beland*
AGENT

United States Patent Office 3,365,158
Patented Jan. 23, 1968

3,365,158
CAN HOLDER
Daniel J. Dowling, Chicago, Ill., assignor to Continental Can Company Inc., New York, N.Y., a corporation of New York
Filed Apr. 18, 1966, Ser. No. 543,362
27 Claims. (Cl. 248—311)

ABSTRACT OF THE DISCLOSURE

An improved can holder for use on a conveyor chain for conveying the cans through a drying oven to dry coating material applied to the exterior of the cans. The holder includes a supporting rod that is attached at one end to the conveyor chain and extends from the chain in a horizontal direction. At least two spider type fitments molded from relatively soft elastomeric material are mounted along the length of the rod. Each fitment has a hub and at least three flexible arms extending radially from the hub. The hub has a central opening that fits over the rod and the arms are provided with hard wear tips at their outer ends. When a can is placed on the holder the wear tips engage the interior side wall of the can causing the arms to bow slightly which sets up elastic recovery forces in the arms resulting in the wear tips being firmly but gently pressed against the side wall to retain the can in place.

---

This invention relates to the art of making light-weight tubular articles, such as, for example, collapsible tubes for such products as toothpaste, sealing compounds, adhesives, auto body repairing putty and the like, type of paste products, as well as can-bodies or empty cans for such products as beer and carbonated beverages.

During the manufacture of such tubular articles, it is often necessary that they be carried on chain conveyors through processing equipment; for example, drying ovens employed to dry decorative and protective coatings applied to exterior surfaces thereof. In order to provide the necessary drying time in the oven or other necessary processing time without making the oven or other processing equipment unnecessarily long, it is the practice to have the associated conveyor chain follow a tortuous path. The tortuous chain path is provided by training the chain in a series of vertical runs between a series of vertically spaced sprockets.

The usual practice, before the present invention, was to provide the conveyor chain with a great number of horizontally extending pins equally spaced along the length thereof over which the tubular articles being manufactured were placed. For the sake of lightness, the pins were of small diameter, usually in the order of about a quarter of an inch, so that the usual tubular article being much larger in diameter, was freely suspended on the pin. The free suspension of the tubular articles on the pins, although satisfactory at the usual slow chain speeds formerly employed, was found to be highly undesirable when modern high speed processing equipment was employed in that it was difficult to keep the articles from vibrating off the pins in passing through the processing equipment on the faster moving chain conveyor. With such a high speed conveyor difficulty was encountered when the chain passed around the sprockets and particularly the upper sprockets. Due to centrifugal force, as a pin passed around an upper sprocket the tubular article thereon was slung outwardly and upwardly so as to be above the pin and it would then fall back down upon the pin with considerable force which occasionally resulted in the marring or scratching of the interior of the tubular article. This slinging of the tubular articles about the pins during the passage of the pins around the sprockets of the processing equipment and particularly around the upper sprockets, also, occasionally resulted in tubular articles being slung off of the pins at this time.

In accordance with the teachings of the present invention, the above problems associated with the commonly used pin type tubular article carriers have been substantially completely eliminated with the tubular articles being securely held in position during passage through the equipment on the chain conveyor at the new higher speeds in such a manner that they will not be vibrated off the holders; marred, scratched, or otherwise damaged.

The holding devices made in accordance with the present invention have wide application for holding tubular articles for transport by conveyors, such as chain conveyors, through processing equipment or between processing operations. They employ features that make them especially suited for carrying the new light-weight one-piece all aluminum empty cans through a drying oven. Such cans are presently being sold in considerable volume as beer containers. As is customary for beer containers, these new light-weight aluminum cans have printed-on decoration, advertising matter and information, usually in several colors extending around substantially the entire periphery of the side wall thereof which must be dried or cured by conveying the cans through a drying oven.

At the present time, by far the great majority of beer cans are fabricated from thin tin plated steel sheets. These cans are of the usual three-piece construction consisting of a can-body portion and two separate end portions double seamed thereto. The can-bodies are made from flat blanks which are cut from large sheets of tin plated steel. Before the large sheets are cut up into individual body blanks they are passed through a coating machine that applies a suitable protective coating such as lacquer or enamel to the side thereof that will eventually be in contact with the container contents. Upon being so protectively coated the sheets are delivered onto wickets against which they lean as they are being conveyed through a drying oven. The opposite side of the sheets is next presented to a suitable printing machine for application of the usual printed-on decoration, advertising matter and information. This matter is printed on in multiple units, each unit being for one of the multiplicity of can-body blanks into which the large sheet will subsequently be cut. After the printing operation, the sheets are again fed into a drying oven and conveyed therethrough on a chain conveyor while leaning against the usual oven wickets. Upon passing through the drying oven, the sheets are stacked and the stack of sheets is cut up on shearing machines into individual can-body blanks. Stacks of the blanks are then hand fed into the feed hopper of a body-maker. Individual blanks are removed from the bottom of the stack by means of suction cups and are fed with intermittent motion through the body-maker. In the body-maker, each blank is pushed sideways into a rolling unit where it is bent around a small diameter roll to break the tension or springiness in the blank. The side edges of each body blank are knurled as the blank passes through a knurling station; the knurls being to help the subsequent flow of solder into the side-seam. The blank is then delivered to a notching station at which the side edges are properly notched and clipped to prepare these edges for the subsequent formation of the inside and outside side-seam hooks. The blank is then passed through first and second folding stations wherein the inside and outside hooks for the side-seam are formed. Upon completion of the hook formations the blank passes through a fluxing station at which flux is applied to the hooks and laps along the side marginal blank edges. The prepared blank is now ready for rounding into the shape of a can-body, which operation is performed at a forming station. At the forming station, forming wings form the can-body blanks around a forming horn. The inside and outside side-seam hooks are engaged and bumped together into locked relationship by means of a reciprocating bumper block. The formed can-body is now removed from the forming horn by means of extractor bars and delivered to the conveyor chain of a side-seaming machine which carries the can-bodies through a soldering station at which solder is applied to the bumped side-seam to fill the interstitial spaces thereof. Excess solder is then wiped from the exterior surface of the seam and the seam is cooled by means of air blasts. As the can-bodies continue through the side-seamer, they are spray coated with lacquer on the inside along the side-seam. If desired, the outside of the side-seam may also be spray coated with a protective lacquer. In order to accomplish soldering of the side-seam, the preapplied protective and decorative coatings on the inside and outside of the can-body terminate a short distance laterally away from the center line of the side-seam providing an uncoated side seam stripe, the coating of which is the object of the just mentioned spraying operations. The can-bodies are now delivered from the side-seamer to a suitable conveyor for subsequent operations thereto.

In the manufacture of the new one-piece, seamless, lightweight all aluminum cans, it is necessary, due to the techniques of manufacturing this type of can, to perform all of the coating operations both interiorly and exteriorly after the can is completely formed. At the present time this type of container is being manufactured by two techniques, one of which is the impact extrusion method which is commonly employed for making collapsible tubes such as tothpaste tubes. In this technique a relatively thick round disk of annealed aluminum is placed into the bottom of a die cavity having a circularly cylindrical side wall corresponding to the exterior diameter of the can to be formed. A punch sized to the interior container diameter is then driven into the cavity so as to strike the aluminum slug with high impact causing the metal in the aluminum slug to extrude upwardly in the die cavity and around the punch, a distance sufficient to provide the necessary can height plus a waste portion that is trimmed off in a subsequent operation to provide an even container mouth rim. The container mouth rim is later flanged and the integral container bottom, which is flat, as initially formed is dished in so as to better withstand high internal pressures and so as to provide a rim around the periphery of the bottom of the container which provides an even resting surface for the container. Since liberal amounts of die lubricant must be used in forming containers by the impact extrusion process, it is necessary to thoroughly clean the containers before any coatings are applied thereto. This is accomplished by passing the containers through a large washing machine where they are treated with appropriate solvents and detergents and then thoroughly rinsed and dried. The containers or cans are now ready for the application of the usual exterior decorative coatings including printed information and advertising matter. Immediately after the printing operations, a transparent varnish overcoat may be employed to protect the printed-on decoration and also to provide a high gloss finish.

In the other commonly used technique employed in making the new one-piece, light-weight seamless all aluminum cans, shallow cup-like work pieces are first drawn and severed from flat aluminum sheet stock. These work pieces then have the shallow height wall portions thereof thinned out and lengthened to the desired can height by passing the work pieces through a series of wall ironing dies. Such cans also must be trimmed to proper length, have the mouth rim flanged, and the bottom dished in and be washed and exteriorly coated just like the cans formed by the impact extrusion process.

The cans formed by these techniques have an integral bottom and are therefore of one-pice construction until they are filled and the closure end is applied; the filled and closed container then being a two-piece construction. In either method of manufacture, after the cans are coated as desired on the exterior side wall surface thereof, they must be passed through a drying oven to dry the exterior coatings. In order to keep the size of the oven relatively small and to achieve rapid drying, it is desirable to operate the drying oven at a relatively high temperature. Temperatures within the range of 300°–400° F. are commonly employed. It is not unusual to operate the oven in the neighborhood of 400° F. plus or minus control tolerance. At these elevated temperatures, the aluminum interior container walls are relatively easily scratched or marred. Any scratching or marring of the interior container walls is highly objectionable when occurring at such elevated oven temperatures, since such scratched or marred areas act to repel the protective coating material subsequently sprayed onto the interior container wall surfaces. If such scratched or marred containers are frequently encountered, it becomes necessary to apply a heavier than normal interior coating in order to prevent metal exposure in the marred or scratched areas and it might perhaps be necessary to resort to multiple coatings being applied with oven drying between coatings in order to achieve complete and reliable metal coverage. For the sake of economy in the coating of the cans, it is, therefore, highly desirable that the interior of the cans not be scratched or marred while the cans are being conveyed through the drying oven on the conveyor chain. The commonly used horizontally extending metal pin type of can holding device permitted the cans too much freedom thereon and vibrated against the inner can surfaces to the extent that the objectionable marring and/or scratching were found to exist at an objectionably high frequency rate.

With the above commentary in mind as to the deficiencies of the commonly used pin type tubular article carriers, it is the general object of the present invention to provide a new and novel tubular article carrier or holder that will firmly hold a tubular article positioned thereon in place as it is being transported on a chain convtyor or the like, with the tubular article being supported entirely on inner surfaces thereof.

It is a somewhat more specific object of the invention to provide a carrier as just above described which is capable of being subjected to temperatures in the neighborhood of 400° F. for extended periods of time without appreciable adverse effect to its capabilities.

A further and still more specific object of the invention is to provide a new and novel carrier for metallic cans that is affixed to an oven chain conveyor and capable of holding a can firmly in place thereon; that contacts only the interior can surfaces; that will not mar, scratch, or otherwise damage the interior surfaces of the can; and, that is capable of withstanding oven temperatures in the neighborhood of 400° F. for prolonged periods of time without any appreciable loss of efficiency thereof.

A still further object of the invention is to provide a new and novel carrier for tubular objects, such as cans, for attachment to a conveyor, such as a chain conveyor; said carrier being light in weight so as not to overload the conveyor when a great many of the carriers are attached thereto; easily fabricated from commonly available relatively inexpensive materials and virtually maintenance free.

Still another object of the invention is to provide a novel spider employed as a tubular article support; said spider being molded of resilient elastomeric material and including a hub and at least three supporting arms extending radially from said hub.

Further and more specific objects and advantages of the invention will become apparent from the following description taken in conjunction with the drawings in which:

FIG. 1 is a side elevation view of can processing apparatus including an oven and associated oven conveyor chain to which can carriers made in accordance with the invention are attached;

FIG. 2 is a perspective view of a can carrier constructed in accordance with the invention and illustrating the means by which it is attached to the oven conveyor chain;

FIG. 3 is a side view of the can carrier and associated conveyor chain of FIG. 2 and shows a can in phantom outline positioned thereon;

FIG. 4 is an end view taken along line 4—4 of FIG. 3;

FIG. 5 is an enlarged fragmentary sectional view taken along line 5—5 of FIG. 4 and illustrating the attachment of a protective cap and can supporting spider to a support rod; and, FIG. 6 is a view similar to FIG. 5 but showing a different way of attaching the can supporting spider to the support rod.

Referring to FIG. 1 of the drawings, it will be seen that a chute 10 is provided for delivering one-piece, integral bottom aluminum cans 11 to a printing machine 12. Associated with the printing machine 12 is an endless conveyor chain indicated at 13. As will be observed on the lower run 14 of the endless chain conveyor 13, cylindrically shaped can holding mandrels 15 are provided at equally spaced intervals along the length of the chain. In the printing machine 12 the cans 11 are placed on the mandrels 15; the cans positioned on the mandrels then being transported past appropriate printing and over-varnish drums. The printing usually consists of several color coats covering substantially entirely the exterior can side wall surface. After all of the color coats have been applied, they are preferably over-varnished with a clear transparent gloss coat. This completes the decorating operations and the decorated cans 11 are delivered along an upper run 16 of the chain 13 to a can transfer machine 17. As shown, the printing machine 12 and can transfer machine 17 are mounted on a common base 20.

In the can transfer machine 17, the freshly decorated cans are transferred from the mandrels 15 of the conveyor chain 13 to an oven conveyor chain 20 on which they are carried through a drying or curing oven that dries the just applied coatings; the oven being indicated at 21.

As will be seen by referring to a lower run of the oven conveyor chain 20 which is indicated at 22 entering the transfer machine 17, the oven conveyor chain 20 is provided with can carrying or holding devices indicated generally at 23 equally spaced along its length. As the lower run of the oven conveyor enters the can transfer machine 17, the can carrying or holding devices 23 mounted thereon are empty and ready to receive cans transferred thereto from the conveyor chain 13; the can transfer operation taking place entirely within the can transfer machine 17. The transferred cans 11 leave the can transfer machine 17 positioned on the can holding devices 23 disposed along an upper run 24 of the oven conveyor chain.

As the oven conveyor chain 20 carries the cans 11 through the drying oven 21 it alternately passes around upper sprockets 25 and lower sprockets 26; there being a multiplicity of such sprockets.

The cured cans are delivered from the oven to a can transfer machine 27 on an interconnecting upper run of the oven conveyor chain 20 indicated at 30. In the can transfer machine 27, the cured cans are removed from the can holding devices 23 and are delivered to a runway 31 ready for the application of the interior protective coating. The unloaded oven conveyor chain 20 returns from the can transfer machine 27 through the oven 21 along a lowermost run thereof indicated at 32 back to the can transfer machine 17 for reloading.

The can holder 23 illustrated in FIG. 2 includes a supporting rod 33 which is preferably round in transverse cross section and fabricated from a suitable metal such as steel or stainless steel. One end of the supporting rod 33 is reduced in diameter so as to provide a shoulder 34 which abuts against the outermost surface of an outer chain link 35 of the oven conveyor chain 20. The reduced diameter end indicated at 36 fits through an opening in the chain links normally occupied by one of the chain pins such as indicated at 37, with the diameter thereof being the same as the diameter of the replaced chain pin. At its terminal end the reduced diameter end portion of the supporting rod 33 is again lightly shouldered down to form an abutment for a nut 40 threaded onto suitable threads provided thereon; the nut 40 acting to retain the supporting rod 33 on the chain 20.

At its opposite or leftward end as viewed in FIG. 2, indicated by the numeral 40, the rod 33 is provided with a suitable protective cap 41. The protective cap 41 may be attached to the rod end 40 in any one of a number of suitable ways. As illustrated in FIG. 5, the protective cap 41 is provided with a cavity 42 into which fits the end 40 of the supporting rod 33 in a press-type fit. If desired, the cavity 42 may be made slightly larger in diameter than the diameter of the rod end 40 and an adhesive employed to effect the adherence of the protective cap 41 to the rod end. Still another alternative is to provide the cavity 42 with suitable screw threads for threaded attachment to a suitably threaded rod end.

The just explained rod 33 having a protective cap such as the cap 41 and being mounted as just described to a conveyor chain such as the chain 20 is typical of the rod or pin type tubular article holders of the prior art. In the manufacture of the new one-piece aluminum cans it was the practice to place the can over the rod or pin until the protective cap arrested further movement of the can onto the pin by striking against the bottom of the can. After being positioned on the pin the can would hang suspended thereon as the chain conveyor passed through the drying oven. It will be apparent that with this arrangement a can is permitted a great amount of freedom on the rod or pin and there is the possibility that during high speed operation, it might be slung off of the pin or vibrated off during passage through the drying oven. The vibration of the carrier pin against the can coupled with the slinging of the can on the pin, particularly when the conveyor chain passed around sprockets often resulted in the scratching or marring of the interior can surfaces making subsequent interior coating operations difficult and expensive to insure proper coverage.

In accordance with the present invention, the formerly used can supporting pins, if a supply was on hand, could be used as the supporting rods 33. A pair of spiders is mounted on the supporting rod 33 in axially spaced relationship; the spiders being generally indicated by the numeral 43. Each spider 43 includes a hub portion 44 and a plurality of arms 45 extending radially outwardly from the hub 44. The terminal ends of the arms 45 are provided with replaceable anti-friction and wear absorbing tips 46 which engage the interior side wall surface of the cans.

As will be seen in FIG. 5, the hub 44 of spider 43 is provided with an opening 47 for receiving the supporting rod therethrough. A pair of collars 50 is employed to retain each of the spiders 43 at desired positions along the rod 33. The collars 50 are maintained in fixed position on the rod 33 by means of set screws 51.

As will be observed in FIGS. 2 and 4, each of the spiders 43 is provided with three of the arms 45. Three of the arms 45 are necessary on each spider 43 in order for the spider to support a can 11 in accordance with the invention, as shown in FIG. 4. If desired, more than three arms may be provided on each of the spiders but for the sake of economy and lightness and for improved oven air circulation within the containers, it is preferred that three arms per spider be employed. Also as best shown in FIG. 4, the spider arms 45 are preferably equal in length and evenly spaced about the hub 44 so that when a can 11 is positioned on the spiders the longitudinal axis of the can will coincide with the longitudinal axis of the supporting rod 33. It is to be understood that the arms 45, however, do not necessarily have to be even in length and equally spaced about the hub 44 in order to achieve the objects of the invention.

The spiders 43 are preferably molded in one-piece from a relatively soft and elastic elastomeric material. In their natural unflexed state the arms 45 as best shown in FIG. 5 will all be perpendicularly disposed with respect to the supporting rod 33 and will be straight and not bowed. However, when a can 11 is placed on a can carrying or holding device 23, as shown in FIG. 3, the arms 45 will be bowed backwardly toward the chain 20 as a result of an interference fit being provided between the interior side wall of the can and the tips 46. Since the spiders 43 are made of relatively soft and elastic elastomeric material it will be apparent that the arms 45 in attempting to return to their unflexed positions will cause the tips 46 on the ends thereof to press lightly outwardly against the interior can side wall surface so as to support the can thereon in such a manner that it will not be easily dislodged. When the can 11 is fully in place on the can holding device 23 the protective cap 41 will contact the center of the integral concave can bottom panel indicated at 52.

With reference to FIG. 4 in which the arms 45 are resiliently bowed so as to fit within the can 11 it is to be understood that if the can 11 were removed the resilient arms 45 would flex back to their normal unbowed condition and the tips 46 would project slightly outwardly beyond the phantom circle circumscribed thereabout in FIG. 4 which represents the interior peripheral surface of the side wall of the can 11. A circle circumscribing the tips 46 with the arms 45 in their unflexed state will therefore be somewhat larger in diameter than the internal diameter of the can 11. As long as this requirement is met it will be understood that the arms 45 do not necessarily have to be equal in length and evenly spaced apart in order to achieve the interference fit of the spider 43 in the can 11 which results in the desired bowing of the arms 45 in the inventive manner.

In FIG. 6 is shown a means for mounting the spiders 43 on the supporting rod 33 which when employed results in the can holding device 23 being very light in weight and inexpensive to make.

The advantage of the FIG. 6 spider mounting is that the collars 50 of the can holding device of FIGS. 1-5 have been eliminated. This results in a considerable saving in weight as well as the cost of the collars. In FIG. 6 it will be observed that the supporting rod 33 is grooved at 53 for receiving the hub 44. The opening 47 in the hub 44 is made smaller in diameter than the general diameter of the rod 33 so that in mounting the spider 43 it is necessary to force the hub 44 over the rod 33 until the hub arrives at the groove 53 at which time it will snap into the groove and resist removal therefrom.

One of the features of the invention is that the antifriction and wear absorbing tips 46 are easily removed and inserted into the ends of the arms 45 making the replacement of worn out tips a very easy operation. As shown in FIG. 5, each of the arms 45 is provided with a cylindrical cavity opening through the end thereof. The cavity, indicated at 54, is somewhat smaller in diameter than a cylindrical shank portion of the tip 46; the shank portion being indicated at 55. Shank portion 55 therefore must be forced into the cavity 54 which is relatively easily done since, as stated before, the spider 43 is molded from relatively soft and elastic elastomeric material. Once the tip 46 is inserted into the end of the arm 45 it is snugly held in place due to the elastic recovery forces set up in the elastomeric material of the arm 45 when the shank portion 55 is press-fitted into the smaller diameter cavity 54. The tip 46 has an enlarged mushroom shaped outer end portion indicated at 56. The top of the enlarged outer end portion of the tip 46 is smoothly rounded as indicated at 57 so that no sharp edges will contact the can. An additional important feature of the tips 46 is that in accordance with the invention they are preferably made from tin. After much experimentation and trial and error it was found that tin tips were very easy on the interior aluminum can side wall and would not mar or scratch the side wall even at elevated oven temperatures in the order of 300° F.–400° F. that the cans are subjected to in the drying oven 21. In this high temperature range the aluminum is more easily scratched and marred than at ordinary room temperatures and once scratched or marred at such elevated temperatures the scratched or marred areas tend to later repel the interior protective coating material being applied rather than to be receptive to it, thus making these areas very difficult to protectively coat. Another advantage of the tin tips is that they stay relatively bright and shiny at the normal oven temperatures of between 300° F.–400° F. The tin tips may also be used to advantage with cans or other subular articles made of tin plated steel and plain steel.

For many low temperature applications the spider 43 can be molded from ordinary rubber or synthetic rubber with the opening 47 and the cavities 54 being provided in the molding operation so that when the spider is removed from the mold it is a completely finished article except for the insertion of the tips 46. Such a molded spider is very light in weight since the material used is relatively light in weight and also due to the fact that not much material is employed. Some typical dimensions of a spider 43 employed on a can holding device for supporting a typical beer can approximately 2½ inches in diameter and 4½ inches long are as follows: hub diameter; ¾ inch; hub width; ¼ inch; diameter of arms; ¼ inch.

When the spiders are to be used at elevated temperatures such as encountered in the drying oven 21 it was found that ordinary rubber either natural or synthetic would rapidly deteriorate and become unserviceable as a result of the heat. Silicone rubber which is a polysiloxane commonly sold under the trade names "Silastic" and "Silicone" was found to last indefinitely at temperatures in the neighborhood of 400° F. a fluorinated hydrocarbon elastomer sold under the trade names, "Viton," "Viton B," "Fluorel" and "Kel-F" may also be used effectively as a substitute for silicone rubber due to its ability to withstand high temperatures.

Not only is it advantageous to make the spiders 43 from an elastomeric material because of its moldability, lightness, and inexpensiveness; such a material also exhibits desirable vibration dampening qualities that dampens much of the vibration transmitted from the chain 20 to the rod 33 that would ordinarily be transmitted to the can 11 in place on a can holding device 23. This reduction in vibration of the can lessens the chance of the tips 46 scratching or marring the interior wall surface of the can regardless of what type of material the tips are made of. It also lessens the possibility of the can being vibrated off of the can holding device 23.

When the can holding device 23 is not to be employed in a high temperature invironment the protective cap 41 covering the end 40 of the supporting rod 33 may be made from a wide variety of suitable thermoplastic materials such as nylon or polyethylene. The material, of course, must be selected so as to be able to hold up under conditions where it will vibrate against the bottom panel of the can. If the can is of the type that requires an interior protective coating, it must be ascertained as to what effect the vibratory contact between the protective cap and can will have on the adhesion of the subsequent interior coating. For high temperature oven work, however, it is necessary that a suitable heat resistant material be used that will not break down or melt at the elevated temperatures expected to be encountered. It has been found that protective caps made from an asbestos mat filler impregnated with a high-temperature phenolic resin binder hold up very well at oven temperatures in the neighborhood of 400° F. This material, which is relatively hard and exhibits low friction properties, is sold under the trade name "Synthane" by the Synthane Corporation, Oaks, Pa. Protective caps made from this material do not mar or scratch the interior of the cans or render the can surface in contact therewith non-receptive to the subsequent interior protective coating. Another suitable alternative is to make the protective caps from tin, like the tips 46. The tin tips 46 also alternatively may be made from "Synthane."

In order to position a can 11 on a holding device 23 as shown in FIG. 3, all that is necessary is to bring the can into position where its longitudinal axis is in axial alignment with the longitudinal axes of the rod 33. The can is then moved axially to the left as viewed in FIG. 3 until the protective cap 41 strikes the concave can bottom panel 52. This results in all of the arms 45 automatically bowing leftwardly in the desired manner as shown. The removal of the can from the holding device 23 is accomplished merely by moving it rightwardly which results in the flexing of the arms 45 so that they bow in the opposite direction than that illustrated as the can slides off of the tips 46.

Although the illustrated can carrier 23 has two spiders 43, additional spiders can be employed along the length of the rod 33 for supporting heavier or longer tubular articles.

While preferred forms of the invention have been shown and explained in compliance with 35 U.S.C. 112, it is to be clearly understood that various changes in the details of construction and arrangement of parts may be made without departing from the spirit and scope of the invention as defined in the appended claims.

What is claimed is:

1. A tubular article carrying device comprising: a supporting rod over which the tubular article is placed; a plurality of resilient arms supported by the rod and extending radially outwardly therefrom; said arms being made of relatively soft elastomeric material and being provided with tin wear tips at outer ends thereof for contact with the interior tubular wall of the tubular article; at least some of said arms being angularly spaced about the rod with some of the arms being spaced axially on the rod with respect to other of the arms and said arms being sized as to length to provide a slight interference fit between the tin wear tips at the outer ends thereof and the interior tubular wall of the tubular article resulting in the arms being resiliently bowed in the direction of motion of a tubular article being placed thereover by relative axial movement between the rod and tubular article resulting in the wear tips at the outer ends of the bowed arms pressing lightly outwardly against the interior tubular wall to return the tubular article in place on the supporting device.

2. A tubular article carrying device as set forth in claim 1 further characterized in that the tin wear tips are replaceable.

3. A tubular article carrying device as set forth in claim 1 further characterized in that the elastomeric material of which said arms are made is of a type capable of withstanding temperatures in the neighborhood of 400° F. for extended periods of time without becoming unserviceable.

4. A tubular article carrying device as set forth in claim 3 further characterized in that the elastomeric material of which said arms are made is a fluorinated hydrocarbon elastomer.

5. A tubular article carrying device as set forth in claim 3 further characterized in that the elastomeric material of which said arms are made is silicone rubber.

6. A tubular article carrying device as set forth in claim 2 further characterized in that the replaceable tin wear tips have a cylindrical shank portion and an enlarged mushroom shaped head portion and each arm includes a cylindrical shank receiving cavity molded into its outer end; said cylindrical cavity being initially smaller in transverse cross section than said shank portion so that said shank portion must be press fitted into said cavity.

7. A tubular article carrying device comprising: a supporting rod over which the tubular article is placed; a plurality of resilient arms supported by the rod and extending radially outwardly therefrom; said arms being made of relatively soft elastomeric material and being provided with wear tips at the outer ends thereof for contact with the interior tubular wall of the tubular article; said wear tips being made of an asbestos mat filler impregnated with a high-temperature phenolic resin binder; at least some of said arms being angularly spaced about the rod with some of the arms being spaced axially on the rod with respect to other of the arms and said arms being sized as to length to provide a slight interference fit between the wear tips at the outer ends thereof and the interior tubular wall of the tubular article resulting in the arms being resiliently bowed in the direction of motion of a tubular article being placed thereover by relative axial movement between the rod and tubular article resulting in the wear tips at the outer ends of the bowed arms pressing lightly outwardly against the interior tubular wall to retain the tubular article in place on the supporting device.

8. A tubular article carrying device as set forth in claim 7 further characterized in that the wear tips are replaceable.

9. A tubular article carrying device as set forth in claim 7 further characterized in that the elastomeric material of which said arms are made is of a type capable of withstanding temperatures in the neighborhood of 400° F. for extended periods of time without becoming unserviceable.

10. A tubular article carrying device as set forth in claim 9 further characterized in that the elastomeric material of which said arms are made is a fluorinated hydrocarbon elastomer.

11. A tubular article carrying device as set forth in claim 9 further characterized in that the elastomeric material of which said arms are made is silicone rubber.

12. A tubular article carrying device as set forth in claim 8 further characterized in that the replaceable wear tips have a cylindrical shank portion and an enlarged mushroom shaped head portion and each arm includes a cylindrical shank receiving cavity molded into its outer end; said cylindrical cavity being initially smaller in transverse cross secton than said shank portion so that said shank portion must be press fitted into said cavity.

13. A tubular article carrying device comprising: a supporting rod over which the tubular article is placed; at least two unitary structures in the form of spider type fitments mounted in axially spaced apart relationship along said supporting rod; each fitment having a hub and a group of at least three arms and said hub having an opening therein into which the supporting rod fits; each said fitment being integrally molded from elastomeric material and said arms being angularly spaced apart around said hub and extending radially outwardly therefrom; said arms being sized as to length to provide a slight interference fit between the outer ends thereof and the interior tubular wall of the tubular article resulting in the arms being resiliently bowed in the direction of motion of a tubular article being placed thereover by relative axial movement between the rod and tubular article resulting in the outer ends of the bowed arms pressing lightly outwardly against the interior tubular wall to retain the tubular article in place on the supporting device.

14. A tubular article carrying device as set forth in claim 13 further characterized in that said supporting rod is provided with a groove at each point therealong where a spider type fitment is located, said groove being sized to receive a hub which snap fits into said groove so as to be retained therein.

15. A tubular article carrying device as set forth in claim 13 further characterized in that the elastomeric material of the spider type fitments is of a type capable of withstanding temperatures in the neighborhood of 400° F. for extended periods of time without becoming unserviceable.

16. A tubular article carrying device as set forth in claim 15 further characterized in that the elastomeric material of the spider type fitments is a fluorinated hydrocarbon elastomer.

17. A tubular article carrying device as set forth in claim 15 further characterized in that the elastomeric material of the spider type fitments is silicone rubber.

18. A tubular article carrying device as set forth in claim 15 further characterized in that the arms of the spider type fitments are provided with relatively hard wear tips at the outer ends thereof for contact with the interior tubular wall of the tubular article.

19. A tubular article carrying device as set forth in claim 18 further characterized in that the wear tips are made of tin.

20. A tubular article carrying device as set forth in claim 19 further characterized in that the wear tips are replaceable.

21. A tubular article carrying device as set forth in claim 20 in which the replaceable tin wear tips have a cylindrical shank portion and an enlarged mushroom shaped head portion and each arm includes a cylindrical shank receiving cavity molded into its outer end; said cylindrical cavity being initially smaller in transverse cross section than said shank portion so that said shank portion must be press fitted into said cavity.

22. A tubular article carrying device as set forth in claim 21 further characterized in that locking collars are positioned on the supporting rod on opposite sides of each hub so as to retain each hub in position on the supporting rod.

23. A tubular article carrying device as set forth in claim 21 further characterized in that the supporting rod is provided with a groove at each point therealong where a spider type fitment is located, said groove being sized to receive a hub which snap fits into said groove so as to be retained therein.

24. A spider type fitment for mounting on a tubular article supporting rod comprising: a hub and at least three resilient arms extending radially outwardly therefrom and being angularly spaced apart around said hub; said hub and arms being integrally molded from elastomeric material; said hub having a molded opening for receiving the supporting rod; said arms being provided with replaceable tin wear tips at the outer ends thereof; said replaceable tin wear tips having a cylindrical shank portion and an enlarged mushroom shaped head portion and each arm including a cylindrical shank receiving cavity molded into its outer end; said cylindrical cavity being initially smaller in transverse cross section than said shank portion so that said shank portion must be press-fitted into said cavity.

25. A spider type fitment as set forth in claim 24 further characterized in that the elastomeric material is of a type capable of withstanding temperatures in the neighborhood of 400° F. for extended periods of time without becoming unserviceable.

26. A spider type fitment as set forth in claim 25 further characterized in that the elastomeric material is a fluorinated hydrocarbon elastomer.

27. A spider type fitment as set forth in claim 25 further characterized in that the elastomeric material is silicone rubber.

References Cited
UNITED STATES PATENTS

| | | | |
|---|---|---|---|
| 485,975 | 11/1892 | Newman | 211—33 XR |
| 1,030,149 | 6/1912 | Aitcheson | 211—33 |
| 2,210,187 | 8/1940 | Ross | 118—500 |
| 2,338,032 | 12/1943 | Friden | 198—131 |
| 3,049,137 | 8/1962 | Cole | 211—74 XR |

EVON C. BLUNK, *Primary Examiner.*

R. J. HICKEY, *Assistant Examiner.*